(12) United States Patent
Seyvet et al.

(10) Patent No.: US 11,330,430 B2
(45) Date of Patent: May 10, 2022

(54) METHOD AND DEVICE FOR ENHANCING VOIP SECURITY BY SELECTIVELY SCRUTINIZING CALLER'S GEOGRAPHICAL LOCATION

(71) Applicant: Telefonaktiebolaget LM Ericsson (publ), Stockholm (SE)

(72) Inventors: Nicolas Seyvet, Kista (SE); Martin Ryan, Solna (SE); Keven Wang, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/325,861

(22) PCT Filed: Aug. 18, 2016

(86) PCT No.: PCT/SE2016/050771
§ 371 (c)(1),
(2) Date: Feb. 15, 2019

(87) PCT Pub. No.: WO2018/034605
PCT Pub. Date: Feb. 22, 2018

(65) Prior Publication Data
US 2019/0215346 A1    Jul. 11, 2019

(51) Int. Cl.
*H04L 29/06* (2006.01)
*H04W 12/06* (2021.01)
(Continued)

(52) U.S. Cl.
CPC ........ *H04W 12/06* (2013.01); *H04L 65/1076* (2013.01); *H04L 69/22* (2013.01); *H04M 1/2535* (2013.01); *H04M 3/42042* (2013.01); *H04M 3/42348* (2013.01); *H04M 3/436* (2013.01); *H04M 3/4365* (2013.01); *H04M 3/5116* (2013.01); *H04M 7/0078* (2013.01);
(Continued)

(58) Field of Classification Search
CPC ................... H04L 65/1076; H04M 3/42042
See application file for complete search history.

(56) References Cited

U.S. PATENT DOCUMENTS

| | | | |
|---|---|---|---|
| 5,001,710 A * | 3/1991 | Gawrys | H04M 3/51 370/271 |
| 8,036,356 B1 * | 10/2011 | Ghosh | H04M 1/575 379/114.14 |

(Continued)

FOREIGN PATENT DOCUMENTS

| | | | |
|---|---|---|---|
| CN | 104093153 A | * | 10/2014 |
| CN | 104093153 A | | 10/2014 |

OTHER PUBLICATIONS

International Search Report and Written Opinion dated Oct. 5, 2016 issued in International Application No. PCT/SE2016/050771. (8 pages).

*Primary Examiner* — Parth Patel
(74) *Attorney, Agent, or Firm* — Rothwell, Figg, Ernst & Manbeck, P.C.

(57) ABSTRACT

The VOIP call security is enhanced using the caller's geographical location information, which is transmitted to the home network device using an unmodifiable header. The home network device checks the veracity of the caller's geographical location information to determine whether the caller is suspicious.

19 Claims, 4 Drawing Sheets

(51) Int. Cl.
  *H04M 3/42* (2006.01)
  *H04W 4/02* (2018.01)
  *H04M 3/51* (2006.01)
  *H04M 11/04* (2006.01)
  *H04M 1/253* (2006.01)
  *H04M 3/436* (2006.01)
  *H04M 7/00* (2006.01)
  *H04L 65/1076* (2022.01)
  *H04L 69/22* (2022.01)
  *H04M 1/663* (2006.01)
  *H04L 65/10* (2022.01)

(52) U.S. Cl.
  CPC .............. *H04M 11/04* (2013.01); *H04W 4/02* (2013.01); *H04L 65/1006* (2013.01); *H04M 1/663* (2013.01); *H04M 3/4211* (2013.01); *H04M 7/006* (2013.01); *H04M 2203/551* (2013.01)

(56) References Cited

U.S. PATENT DOCUMENTS

| | | | |
|---|---|---|---|
| 8,270,588 B2 * | 9/2012 | Schwartz | H04M 3/436 379/201.02 |
| 8,312,660 B1 * | 11/2012 | Fujisaki | F41A 17/08 42/70.11 |
| 8,340,711 B1 * | 12/2012 | Glass | H04W 8/18 455/552.1 |
| 8,391,859 B1 * | 3/2013 | Pulugurta | H04W 36/0022 455/433 |
| 8,428,052 B1 * | 4/2013 | Pankajakshan | H04W 76/19 370/352 |
| 8,601,146 B2 * | 12/2013 | Pascual Avila | H04L 63/08 455/404.1 |
| 8,634,520 B1 * | 1/2014 | Morrison | H04M 3/4878 370/241 |
| 8,774,785 B1 * | 7/2014 | Kirchhoff | H04W 4/14 455/415 |
| 8,811,183 B1 * | 8/2014 | Anand | H04L 49/25 370/237 |
| 8,811,276 B2 * | 8/2014 | Noldus | H04L 65/1069 370/328 |
| 9,084,105 B2 * | 7/2015 | Luna | H04W 8/24 |
| 9,088,560 B1 * | 7/2015 | Newstadt | H04L 63/08 |
| 9,203,954 B1 * | 12/2015 | Van Rensburg | H04M 3/42042 |
| 9,247,047 B2 * | 1/2016 | Robbins | H04M 3/4935 |
| 9,258,264 B1 * | 2/2016 | Shoham | H04L 51/32 |
| 9,258,386 B2 * | 2/2016 | Croy | H04L 41/12 |
| 9,264,856 B1 * | 2/2016 | Kotab | H04W 4/029 |
| 9,350,717 B1 * | 5/2016 | Siddiqui | H04L 63/08 |
| 9,479,985 B2 * | 10/2016 | Lau | H04L 43/026 |
| 9,565,261 B2 * | 2/2017 | Babaian | H04W 4/029 |
| 9,635,172 B2 * | 4/2017 | Chiu | H04M 7/0024 |
| 9,641,680 B1 * | 5/2017 | Wold | G10L 17/00 |
| 9,648,644 B2 * | 5/2017 | Livingood | H04W 64/00 |
| 9,660,954 B2 * | 5/2017 | Li | H04L 61/1529 |
| 9,769,312 B1 * | 9/2017 | Liu | H04M 3/42221 |
| 9,774,726 B1 * | 9/2017 | Jenkins | H04M 3/2281 |
| 9,779,271 B2 * | 10/2017 | Kanakarajan | G06F 21/88 |
| 9,872,148 B2 * | 1/2018 | King | H04W 4/029 |
| 9,894,199 B1 * | 2/2018 | Wiechman | H04M 3/42068 |
| 9,959,513 B2 * | 5/2018 | Borodow | G06Q 10/063114 |
| 2003/0112942 A1 * | 6/2003 | Brown | G06Q 20/4037 379/196 |
| 2005/0246295 A1 * | 11/2005 | Cameron | G01D 4/004 705/412 |
| 2007/0041513 A1 * | 2/2007 | Gende | H04M 3/5116 379/37 |
| 2008/0086226 A1 * | 4/2008 | Fein | H04L 65/1069 700/94 |
| 2008/0140841 A1 * | 6/2008 | Ott | H04L 63/166 709/226 |
| 2008/0170672 A1 * | 7/2008 | Cai | H04M 3/42059 379/88.13 |
| 2010/0205316 A1 * | 8/2010 | Xue | H04W 12/104 709/229 |
| 2010/0279656 A1 * | 11/2010 | Hazzani | G06Q 20/32 455/411 |
| 2010/0291972 A1 * | 11/2010 | Gandhi | H04M 1/72522 455/563 |
| 2011/0040833 A1 * | 2/2011 | Curescu | H04M 3/42042 709/203 |
| 2011/0083111 A1 * | 4/2011 | Forutanpour | G06F 1/1694 715/863 |
| 2012/0088470 A1 * | 4/2012 | Raleigh | G06Q 30/0284 455/406 |
| 2012/0147753 A1 * | 6/2012 | Jayawardena | H04L 41/5022 370/238 |
| 2012/0167208 A1 * | 6/2012 | Buford | H04M 3/5183 726/22 |
| 2012/0213082 A1 * | 8/2012 | Carney | H04L 63/1466 370/241 |
| 2013/0311371 A1 * | 11/2013 | Zhu | G06Q 20/3224 705/44 |
| 2014/0112457 A1 * | 4/2014 | Xing | H04M 3/436 379/32.01 |
| 2014/0137199 A1 * | 5/2014 | Hefetz | G06Q 20/32 726/3 |
| 2014/0179284 A1 * | 6/2014 | Song | H04W 4/16 455/414.1 |
| 2014/0235262 A1 * | 8/2014 | Cho | H04W 28/0247 455/453 |
| 2014/0279111 A1 * | 9/2014 | Mahaffey | G06Q 20/3278 705/21 |
| 2014/0286484 A1 * | 9/2014 | Ehrlich | H04M 3/436 379/142.06 |
| 2014/0293996 A1 * | 10/2014 | Livingood | H04L 41/12 370/352 |
| 2014/0379911 A1 * | 12/2014 | Fayssal | H04L 63/08 709/225 |
| 2015/0069219 A1 * | 3/2015 | Klein | G01C 11/00 250/208.1 |
| 2015/0092610 A1 * | 4/2015 | Russell | H04M 15/66 370/259 |
| 2015/0094026 A1 * | 4/2015 | Martin | G06Q 30/016 455/411 |
| 2015/0103991 A1 * | 4/2015 | Albert | H04M 3/56 379/202.01 |
| 2015/0118999 A1 * | 4/2015 | Merchant | H04M 15/80 455/411 |
| 2015/0281955 A1 * | 10/2015 | Zhang | H04W 12/06 726/4 |
| 2015/0304983 A1 * | 10/2015 | Krening | H04W 64/003 370/254 |
| 2016/0057651 A1 * | 2/2016 | Backholm | H04W 28/0284 370/235 |
| 2016/0065712 A1 * | 3/2016 | Zhekov | H04M 19/04 455/567 |
| 2016/0085523 A1 * | 3/2016 | Hall | G06F 8/48 717/140 |
| 2016/0086158 A1 * | 3/2016 | Yu | G06Q 20/401 705/44 |
| 2016/0094669 A1 * | 3/2016 | Karampurwala | H04L 69/22 370/328 |
| 2016/0148332 A1 * | 5/2016 | Stibel | G06Q 20/4014 705/44 |
| 2016/0156676 A1 * | 6/2016 | Verin | H04L 65/1016 709/228 |
| 2016/0189159 A1 * | 6/2016 | Luk | G06Q 20/3224 705/39 |
| 2016/0241676 A1 * | 8/2016 | Armstrong | H04L 67/22 |
| 2017/0006417 A1 * | 1/2017 | Canoy | H04W 4/029 |
| 2017/0010783 A1 * | 1/2017 | Beattie | H04L 67/306 |
| 2017/0024234 A1 * | 1/2017 | Wu | G06F 9/45558 |
| 2017/0118187 A1 * | 4/2017 | El Khoury | H04L 67/12 |
| 2017/0133017 A1 * | 5/2017 | Rajakumar | H04M 15/47 |
| 2017/0149983 A1 * | 5/2017 | Vagelos | H04M 3/5116 |
| 2017/0155767 A1 * | 6/2017 | Cohen | H04L 65/1059 |

(56) References Cited

U.S. PATENT DOCUMENTS

| | | | |
|---|---|---|---|
| 2017/0195339 A1* | 7/2017 | Brown | H04L 63/107 |
| 2017/0295281 A1* | 10/2017 | Lasso | H04M 7/006 |
| 2018/0039975 A1* | 2/2018 | Hefetz | G06Q 20/3224 |
| 2018/0041492 A1* | 2/2018 | Jacobs | H04W 4/029 |
| 2018/0041530 A1* | 2/2018 | Tang | H04L 63/107 |
| 2018/0041823 A1* | 2/2018 | Gaubitch | H04M 3/2281 |
| 2018/0082384 A1* | 3/2018 | Karroum | H04L 67/306 |
| 2018/0332503 A1* | 11/2018 | Olson | H04L 43/10 |
| 2019/0215346 A1* | 7/2019 | Seyvet | H04L 65/1076 |
| 2019/0289466 A1* | 9/2019 | Conant | H04W 12/06 |
| 2020/0186968 A1* | 6/2020 | Kondo | G01S 19/14 |

* cited by examiner

METHOD AND DEVICE FOR ENHANCING VOIP SECURITY BY SELECTIVELY SCRUTINIZING CALLER'S GEOGRAPHICAL LOCATION

CROSS REFERENCE TO RELATED APPLICATION(S)

This application is a 35 U.S.C. § 371 National Stage of International Patent Application No. PCT/SE2016/050771, filed Aug. 18, 2016, designating the United States.

TECHNICAL FIELD

Embodiments of the subject matter disclosed herein generally relate to methods and devices for enhancing Voice Over Internet Protocol (VOIP) security, using caller's location information.

BACKGROUND

In the last couple of decades, the proliferation of mobile phones and digital communications led to a spectacular increase in the number of calls. Simultaneously, fraudulent calls by various scammers have also increased and became more sophisticated. We are all vulnerable, but some people (e.g., older persons or persons with disabilities) are more vulnerable than others.

Today, when receiving a call, a phone number is displayed on the callee's phone. If the caller is a known contact, then the caller's name is displayed in addition to or instead of the phone number. Situations in which scammers deceivingly appear to be legitimate calls are known as spoofing attacks. For example, the caller appears to be callee's bank when in fact it is not. Such calls often originate from unlikely locations, inconsistent with the alleged identity. Currently, there are no reliable techniques for ensuring or confirming that the caller is who he/she pretends to be.

The most common transmission protocol, SIP (Session Initiation Protocol) offers a mechanism to track the path of a call across the network. In SIP, there is a header named "via", which is used to track the visited nodes along the call's path. Since this header is optional and can be anonymized, it is not possible to rely that the caller's location is correctly identified using the "via" header.

A recently discussed Private Header (P-Header) extension to SIP (described in RFC7315 document of Internet Engineering Task Force, IETF, from July 2014) includes P-Visited-Network-IDs, which may reveal the caller's location. A P-Visited-Network-ID indicates a visited network device, which is an intermediate device transmitting messages between the caller and the home network device (i.e., the network device that connects the call to the callee user equipment, UE). According to RFC7315, any visited network device inserts an identifier (i.e., a P-Visited-Network-ID) known by the home network device, in the P-Header. These identifiers should be globally unique, and may be a quoted text string or a token. The home network device may use the identifiers to verify the existence of roaming agreements with the visited network devices, and to authorize the caller's registration.

This P-Visited-Network-ID approach has a number of drawbacks and limitations. First, the granularity of the location information is coarse, the P-Visited-Network-ID indicating location at a country level, instead of a province, city or even smaller divisions of a geographical area. Second, the P-Visited-Network-ID approach assumes that there are trust relationships between the home network device and visited network devices. This is not always the case, since the P-header can be modified by a malicious visited network device. In other words, the malicious visited network device modifies one or more P-Visited-Network-IDs in the P-header. In order to prevent such modifications, all visited devices should apply a hop-by-hop integrity protection mechanism such as IPsec, or other available mechanisms. Given these drawbacks and limitations, this P-header based mechanism does not effectively provide the caller's location information in a way that is usable to identifying spoofing attacks.

It is desirable to find mechanisms for effectively enhancing VOIP security by using accurate and reliable caller's location information.

SUMMARY

In order to enable a network to reject or to signal suspicious calls, a mandatory header is implemented in the transmission protocol. This mandatory header cannot be stripped from the associated message, and is added by a trusted network element (e.g., the first network node that the message traverses). For example, in IMS SIP, this network node may be the P-CSCF (proxy Call Session Control Function) of the user on the user's initial REGISTER request.

According to an embodiment, there is a method performed by a network operator, for enhancing security of VOIP calls. The method includes determining whether a scrutiny of a caller is required when a call is initiated. The method further includes, requesting the caller's geographical location information, if determined that the scrutiny is required, and checking veracity of the caller's geographical location information to determine whether the caller is suspicious.

According to another embodiment there is network operator device configured to enhance security of VOIP calls having a communication interface and a processing unit. The communication interface is configured to exchange messages with other devices in a communication network. The processing unit, which includes at least one processor and is connected to the communication interface, is configured to determine whether a scrutiny of a caller is required when a call is initiated, to control the communication interface to request a caller's geographical location if the scrutiny is required, and to check veracity of the caller's geographical location in order to determine whether the caller is suspicious.

According to yet another embodiment there is a network operator device configured to enhance security of VOIP calls having a logic module, an information demand module and a verification module. The logic module determined whether a scrutiny of a caller is required. The information demand module requests caller's geographical location information when the logic module has determined that the scrutiny is required. The verification module checks veracity of the caller's geographical location information to determine whether the caller is suspicious.

According to another embodiment, there is a client device in a communication network having a communication interface configured to send and receive messages from other devices in the communication network, and a data processing unit. The data processing unit, which includes at least one processor and is connected to the communication interface, is configured to control the communication interface to send a message with an unmodifiable header including geographical location information of the client device, upon request.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In some embodiments set forth below, the security of VOIP calls is enhanced by using the caller's geographical information obtained in a reliable manner. The network device that connects the call to the callee and/or the callee are enabled to better decide whether to forward, reject or answer the call. The network device may first evaluate whether the callee is vulnerable. This evaluation may be a default service for everyone (since anyone may be a target of a spoofing attack) or an optional service. The level of scrutiny employed in this evaluation may be varied from a low scrutiny (e.g., triggered by a default service) to a higher scrutiny based on the callee's profile (i.e., the callee's profile may include an indication that a higher level of scrutiny has been set). Old and/or disabled people are usually more vulnerable to spoofing attacks. A callee or his/her relatives can request that the network operator to insert an indication that the callee is vulnerable into the callee's profile.

If determined that the callee is vulnerable, the network device then requests the caller's geographical location information via an additional header that cannot be modified by intermediate devices. Upon receiving the additional header, the network device checks veracity of the caller's geographical location information. If the result of the veracity check is that the geographical location information is trustworthy, the network device may or may not present the geographical location information to the callee. If the result of the veracity check is that the geographical location information is not trustworthy, the network device warns the callee that the caller is suspicious.

The caller being suspicious is indicated to the callee's user equipment (UE) in order to reach the callee. If callee's UE is a modern UE, a warning and/or the caller's geographical location information can be displayed on the UE's screen. For older devices, a voice announcement and/or ringtone may be used to indicate a suspicious caller. In one embodiment, the voice announcement may announce the caller's geographical location information.

Figure 1:
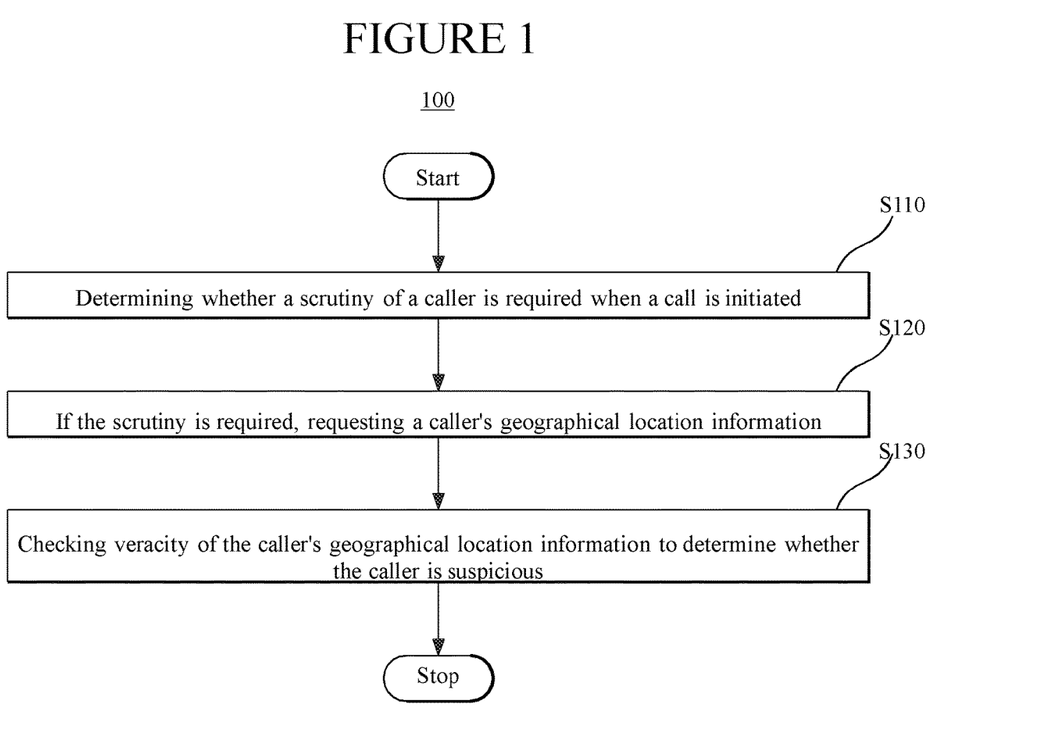
FIG. 1 is a flowchart of a method according to an embodiment.

In view of the above-discussed aspects, FIG. 1 is a flowchart of a method 100 performed by a network operator, for enhancing security of VOIP calls, according to an embodiment. Method 100 includes determining whether a scrutiny of the caller is required when a call is initiated at S110. Method 100 further includes requesting a caller's geographical location information, when determined that the scrutiny is required at S120, and checking veracity of the caller's geographical location information to determine whether the caller is suspicious, at S130. These steps may be performed by a same physical device, or by two or more intermediate devices, between the caller and the callee. While steps S110 and S120 can easily be performed by any of the intermediate nodes, it seems favorable to perform S130 at the first node on the caller side. Alternatively, S130 is performed by another node that obtains information about the first node's location to enable the veracity check.

The scrutiny may be required if the callee's profile includes an indication for enhanced VOIP security service. This indication may be included in the callee's profile upon receiving an enhanced VOIP security service request.

The scrutiny being required may alternatively or additionally be determined by analyzing a call detail record (CDR) of the caller. The CDR is a data record that documents details related to a UE's communications. For example, the CDR includes time, duration, completion status, source number, and destination number for each call of the UE. Since the network operator owns CDR, network devices can analyze it. The result of the CDR analysis can be stored and/or shared.

Such CDR analysis may determine that scrutiny is required if caller's calls have often been rejected by other callees and/or the caller's calls frequently lasted less than a predetermined time interval (e.g., 30 s). Alternatively or additionally, the CDR analysis may determine that the scrutiny is not required if the average duration of prior calls between the caller and the callee is longer than a predetermined threshold (e.g., 30 s).

Requesting the caller's geographical location information may trigger receiving a reply message with the caller's geographical location information included in an unmodifiable header.

If determined that the caller is suspicious at S130, the network device may then inform the callee before connecting the call, or may not connect the call to the callee. Informing the callee may be achieved by forwarding the caller's geographical location information to the callee, sending an audio message to the callee prior to connecting the call, and/or activating a warning signal detectable by the callee.

Step S130, may include evaluating whether the caller's geographical location is in the same geographical area as a location of a first network operator node accessed to initiate the call. If the caller's geographical location is not in the same geographical area as the first network operator node's location, then the caller is suspicious. There are various sources from which a network operator device may acquire the first operator node's geographical location. For example, a node's geographical location may be using device's Location Area Identity (LAI). LAI is a unique number that identifies a particular location on Earth.

Figure 2:
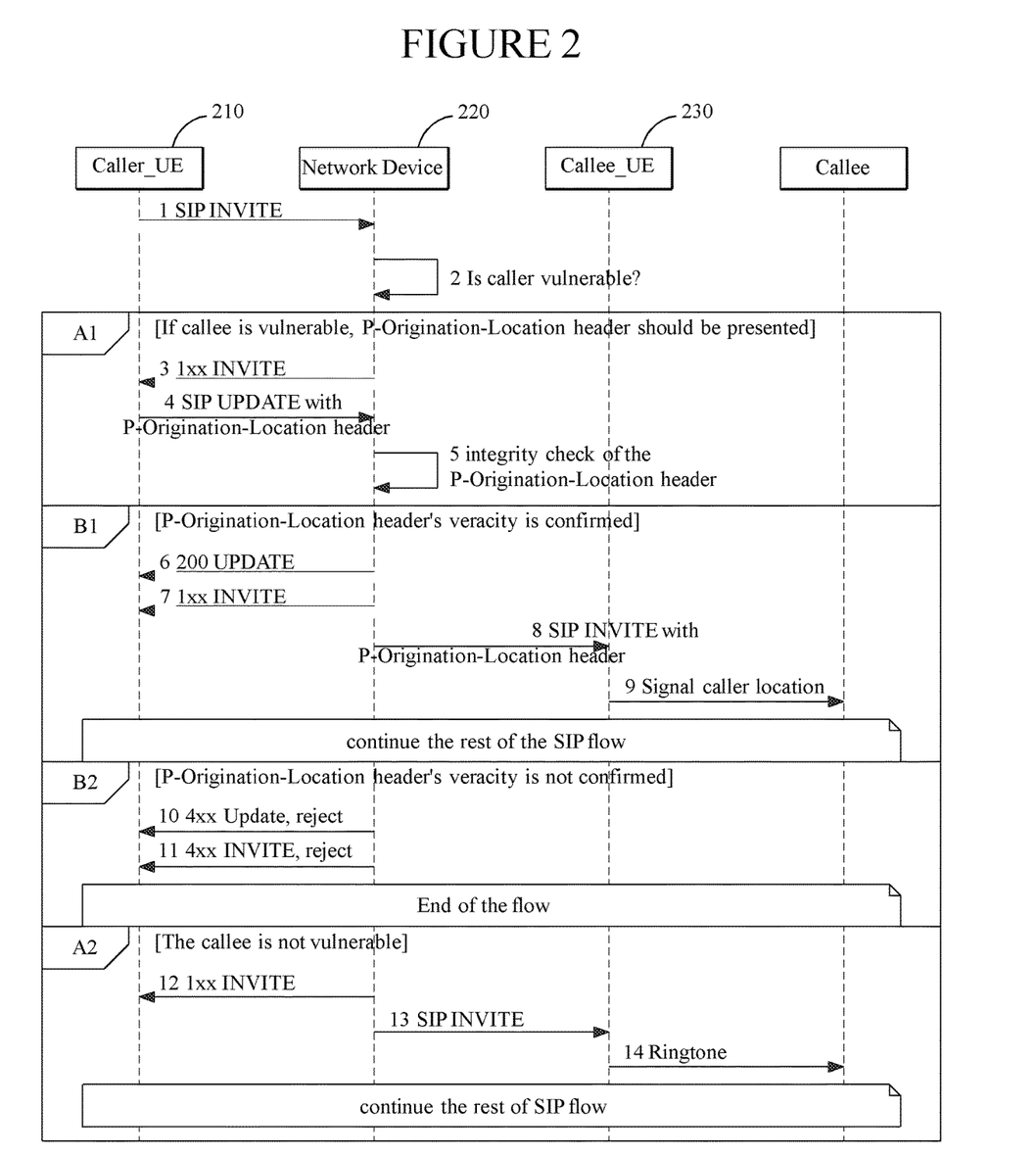
FIG. 2 is a schematic diagram illustrating communications between a caller user equipment (UE), a network device, and a callee UE, according to an embodiment.

FIG. 2 illustrates communications between a caller UE 210, a network device 220, and a callee UE 230 (time order of the illustrated operations is from up to down), in a SIP environment. A new optional but un-modifiable header is enabled (i.e., to be generated and transmitted) in this SIP environment. This new header named, for example, "P-Origination-Location," carries the caller's geographical location information. This header may include a text string and may be generated by the caller's UE upon receiving a request from its first network node. The first network node may perform a veracity check of this text string.

As illustrated in FIG. 2, first (at 1), the caller UE 210 sends an SIP INVITE message to initiate a VOIP call with the callee. Although in FIG. 2, no visited devices are illustrated between the caller UE 210 and the network device 220, such other devices may be present. The callee UE and the network device may pertain to a different network than the caller UE.

Upon receiving the SIP INVITE message, the network device 220 determines whether the callee is vulnerable at 2. Steps 3-11, which are labeled A1, follow if determined that the callee is vulnerable, and steps 12-14, which are labeled A2, follow if determined that the callee is not vulnerable. Determining that the callee is vulnerable triggers requesting, generating and transmitting the P-Origination-Location header in the network. Thus, if the callee is vulnerable (A1), the network device 220 sends SIP response 1xx to caller UE 210 requesting the caller UE to provide P-Origination-Location header, at 3. Then, at 4, the caller UE 210 sends an SIP UPDATE message including the P-Origination-Location header to the network device 220.

The network device 220 verifies the P-Origination-Location header's veracity at 5. Steps 6-9, which are labeled B1, follow if veracity is confirmed, and steps 10 and 11, which are labeled B2, follow if veracity is not confirmed. If the P-Origination-Location header's veracity is confirmed (B1), the network device 220 replies by sending a "200 UPDATE" SIP message to the caller UE 210 at 6, and then responds to the initial SIP INVITE received at 1, by sending a "1xx INVITE" message to the caller UE 210 at 7.

The network device 220 then sends a "SIP INVITE" message including the "P-Origination-Location" header to the callee UE 230 at 8. Upon receiving this "SIP INVITE" message, the callee UE 230 conveys the caller's location information from the P-Origination-Location header to the callee, using the ringtone, a voice message and/or displaying this information at 9. The known flow of the VOIP call then follows.

If the network device 220 determines that the P-Origination-Location header's veracity is not confirmed (B2), then the call is rejected by the network device that sends a "4xx UPDATE" reject message at 10, and a "4xx INVITE" reject message at 11, to the caller UE 210. The network device 220 may transmit an indication (e.g., a 0 value instead of a valid location) in the P-Origination-Location header if it has already determined that the caller is suspicious.

If at 2, the network device 220 determined that the callee is not vulnerable (A2), then the network device 220 sends a "1xx INVITE" message to the caller UE 210 at 12, and a "SIP INVITE" message to the callee UE 230 at 13. Upon receiving the "SIP INVITE" message at 13, the callee UE 230 produces the regular ringtone at 14.

The network device may perform an integrity check of the P-Origination-Location header received from the caller UE. For example, the network device may verify whether the geographical location information provided by caller UE is in the same geographical area (like city, or region) of the first traversed network node. The geographical coordinates of the first network node may be correlated to a specific area of the city and country.

If callee UE is a smart phone, the geographical location information can be displayed directly on the screen with the phone number. This type of callee UE may also indicate that the caller is suspicious if instead of the location information it has been received an indication that the caller is suspicious (e.g., a "0" value). The smart phones may also use a special ring tone to signal a suspicious caller. If callee UE is an older phone, then the network device may translate the geographical location information into an audio message causing the phone to play it either as a ringtone or a voice announcement when the callee picks up the call.

To summarize, the features that enable an enhanced VOIP security are:
- an additional network header that is optional but non-modifiable for VOIP applications;
- the network device evaluates if the callee is vulnerable;
- if determined that the callee is vulnerable, the network device requests additional geographical location information of the caller to check if caller is suspicious;
- network device performs an integrity check of the geographical location information
- if integrity is confirmed, network device provides the geographical location information to the callee.
- if integrity is not confirmed, then the callee is informed that the caller is suspicious.

Figure 3:
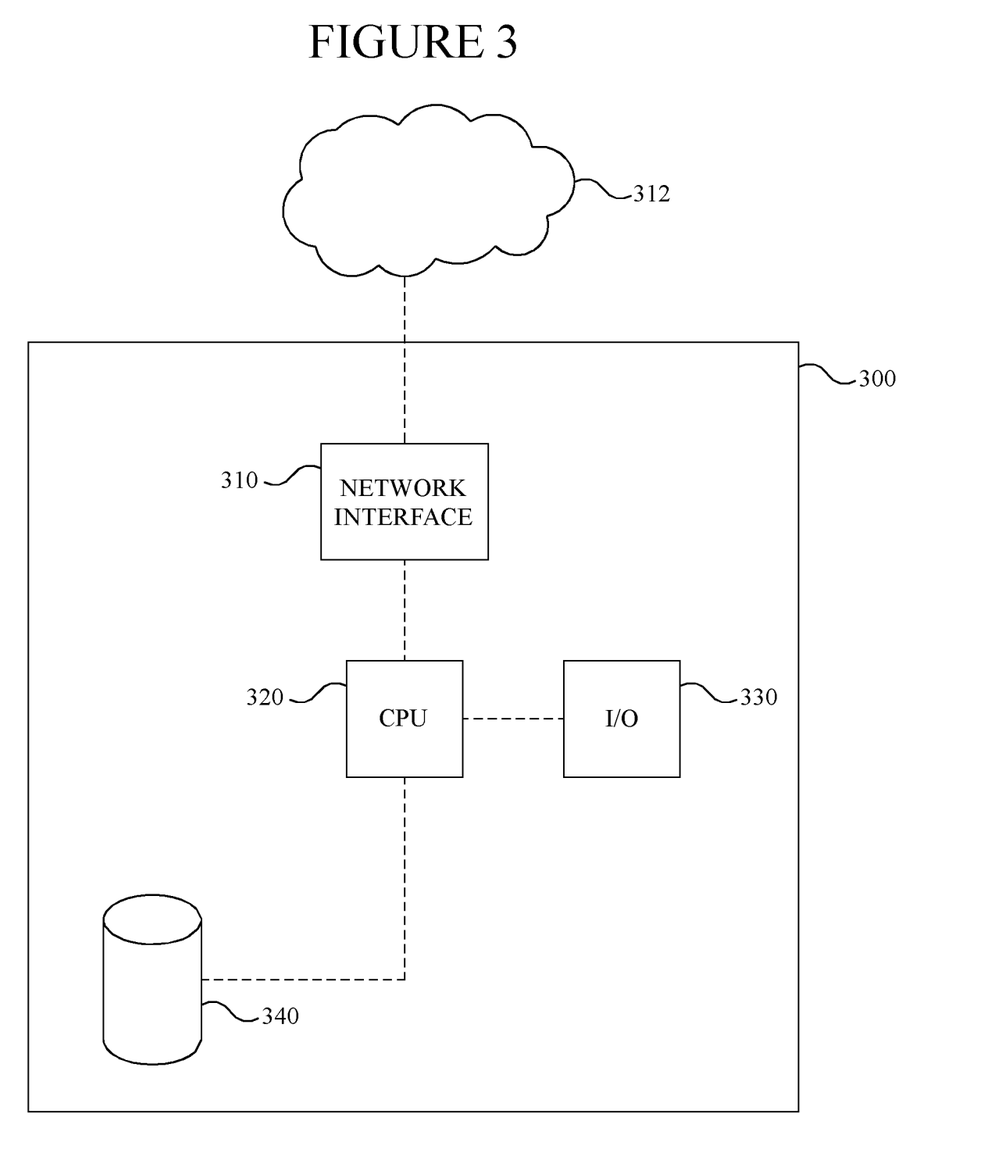
FIG. 3 is a schematic diagram of a network device according to an embodiment.

FIG. 3 is a block diagram of a network device 300 including a communication interface 310 and a processing unit 320. The communication interface is configured to exchange messages with other devices in a communication network 312. The communication interface may receive a message including the caller's geographical location information in an unmodifiable header.

The processing unit includes at least one processor and is connected to the communication interface. The processing unit is configured to determine whether a scrutiny of a caller is required when a call is initiated, to control the communication interface to request a caller's geographical location information if the scrutiny is required, and to check veracity of the caller's geographical location information to determine whether the caller is suspicious.

The processing unit may determine that the scrutiny is required if a callee's profile includes an indication that an enhanced VOIP security is required. The data processing unit may have added this indication in the callee's profile upon receiving a request. The processing unit may determine that the scrutiny is required if analyzing the CDR reveals that caller's calls have often been rejected by other callees, or that the caller's calls have lasted frequently less than a predetermined time interval. Additionally, the processing unit may determine that the scrutiny is not required if analyzing the CDR reveals that prior calls between the caller and the callee lasted in average longer than a predetermined duration.

The processing unit may control the communication interface to inform the callee before connecting the call, or not connecting the call to the callee, if the caller is suspicious. The communication interface may inform the callee that the caller is suspicious by forwarding the caller's geographical location to the callee, triggering an audio message prior to connecting the call, or activating a warning signal (e.g., a specific ringtone) detectable by the callee.

The processing unit may check the veracity by evaluating whether the caller's geographical location is in a same geographical area as a location of a first network operator node accessed to initiate the call.

Network operator device 300 may also include a memory 340 and an operator interface 330. The memory may store executable codes which, when executed by the processing unit make the processing unit to determine whether the scrutiny is required, to control the communication interface, and to check the veracity of the caller's geographical location information.

Figure 4:
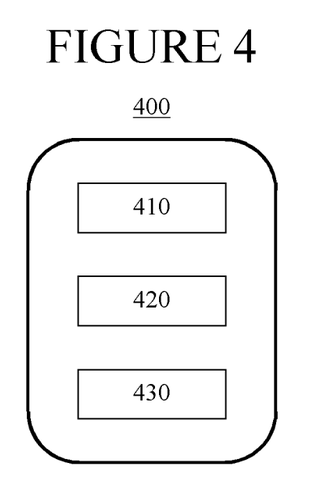
FIG. 4 is a block diagram of a network device according to another embodiment.

According to another embodiment, a network operator device 400 is illustrated in FIG. 4. This device is configured to enhance security of VOIP calls and includes a logic module 410, an information demand module 420 and a verification module 430. Logic module 410 determines whether a scrutiny of a caller is required, when a call is initiated. Information demand module 420 requests caller's geographical location information when the logic module has determined that the scrutiny is required. Verification module 430 checks veracity of the caller's geographical location information to determine whether the caller is suspicious.

Figure 5:
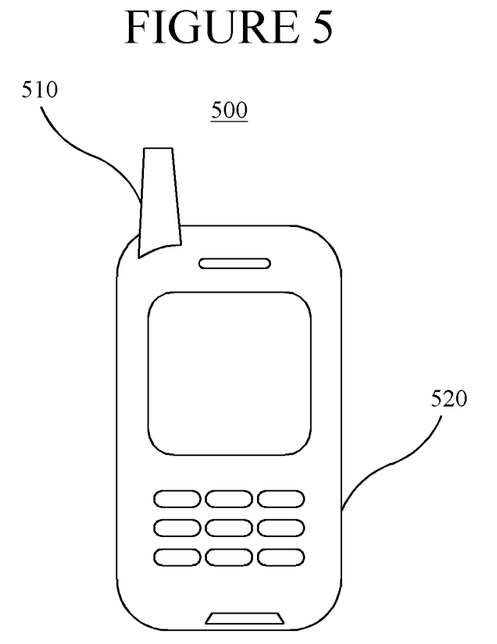
FIG. 5 is a schematic representation of a client device according to an embodiment.

FIG. 5 illustrates a client device 500, which may operate as the caller's phone. Device 500 includes a communication interface 510 configured to send and receive messages from other devices in a communication network, and a data processing unit 520. Data processing unit 520, which includes at least one processor and is connected to the communication interface, is configured to control the communication interface to send a message with an unmodifiable header (e.g., a P-Origination-Location header) including geographical location information of the client device, upon request.

According to yet another embodiment, there is a network node configured to serve client devices in a predetermined area. The network node may have the same structure as the device illustrated in FIG. 3. The network node according to this embodiment is enabled to obtain its location and a range of an area it covers (i.e., the node is configured to provide network connectivity to devices within the covered area). The network node may have a Global Positioning Satellite (GPS) module, which enables it to identify its location. Alternatively, the network node's location may be a parameter provided by the network when setting up the network node. The network may additionally also inform the network node about its coverage (for example, a circle whose center is the network node's location and radius is 100 km). The coverage may also be a configurable parameter.

Unlike conventional network nodes, upon receiving a connection request from a device, this network node (the processing unit thereof) verifies if the device's location information included in a P-Origination-Location header is within its service range. If the device's location information in the P-Origination-Location header is not within the network node's service range, the network node may either reject the connection request, or forward the request with the P-Origination-Location header and an indication that the caller is suspicious.

The methods and devices described in this section enhance VOIP security using reliable caller geographic location information. The caller has to reveal its geographical location information. Having this information makes it more likely that a vulnerable person is warned to be cautious. For example, if a caller pretending to be your local bank is located in a different country, the callee is on notice. The caller's geographical location information may be transmitted using an SIP header that once associated with a message cannot be modified by visited network devices.

Thus, the embodiments disclosed in this section provide methods and network devices that enhance security of VOIP calls based on reliable location information for the caller. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method performed by a network operator, for enhancing security of a Voice Over Internet Protocol (VoIP) call initiated by a calling device to a callee, the method comprising:
   receiving a first message transmitted by the calling device, wherein the first message indicates that the calling device is initiating the VoIP call;
   determining whether a scrutiny of the call is required;
   as a result of determining that a scrutiny of the call is required, requesting the calling device's geographical location information;
   receiving the requested geographical location information, wherein the received geographical location information identifies a stated geographical location of the calling device;
   checking veracity of the received geographical location information to determine whether the call is suspicious, wherein checking the veracity of the received geographical location information comprises:
   i) identifying a network node that received the first message indicating that the calling device is initiating the VoIP call;
   ii) determining a geographical location of the network node; and
   iii) comparing the geographical location of the network node with the stated geographic location of the calling device.

2. The method of claim 1, wherein the scrutiny is required if the callee's profile includes an indication for enhanced VOIP security service.

3. The method of claim 2, further including:
receiving a request to include the indication for enhanced VOIP security in the callee's profile.

4. The method of claim 1, wherein whether the scrutiny is required is determined by analyzing a call detail record (CDR) of the caller.

5. The method of claim 4, wherein the analyzing of the CDR determines that the scrutiny is required if calls placed by the caller have often been rejected by other callees and/or if calls placed by the caller lasted frequently less than a predetermined time interval.

6. The method of claim 4, wherein the analyzing of the CDR determines that the scrutiny is not required if prior calls between the caller and the callee lasted longer than a predetermined duration.

7. The method of claim 1, wherein
the first message transmitted by the calling device is a Session Initiation Protocol (SIP) Invite message, and
the step of requesting the calling device's geographical location information comprises transmitting to the calling device a SIP response message, and
the method further comprises receiving a SIP Update message transmitted by the calling device in reply to the SIP response message, the SIP Update message comprising a private header field comprising the geographical location information that identifies the stated geographical location of the calling device.

8. The method of claim 1, further comprising:
if the call is suspicious, informing the callee before connecting the call, or rejecting the call.

9. The method of claim 8, wherein the informing is achieved by at least one of:
forwarding the received geographical location information to the callee;
sending an audio message to the callee prior to connecting the call, wherein the audio message comprises one of a voice announcement or a ringtone; or
activating a warning signal detectable by the callee, wherein the warning signal comprises one of a warning displayed on a device of the callee or a display of the received geographical location information on the device of the callee.

10. A network operator device configured to enhance security of a Voice Over IP (VOIP) call initiated by a calling device to a callee, the network operator device comprising:
a receiver for receiving a first message transmitted by the calling device, wherein the first message indicates that the calling device is initiating the VoIP call; and
a processing unit that includes at least one processor, wherein the network operator device is configured to:
determine whether a scrutiny of the call is required;
as a result of determining that a scrutiny of the call is required, request the calling device's geographical location information;
receive the requested geographical location information, wherein the received geographical location information identifies a stated geographical location of the calling device;
check veracity of the received geographical location information to determine whether the call is suspicious, wherein the network operator device is configured to check the veracity of the received geographical location information by performing a process that comprises:
identifying a network node that received the first message indicating that the calling device is initiating the VoIP call;
determining a geographical location of the network node; and
comparing the geographical location of the network node with the stated geographic location of the calling device.

11. The network operator device of claim 10, wherein the scrutiny is required if the callee's profile includes an indication that an enhanced VOIP security is required.

12. The network operator device of claim 11, wherein the processing unit adds the indication in the callee's profile upon receiving a request.

13. The network operator device of claim 10, wherein the processing unit determines whether the scrutiny is required based on analyzing a call detail record (CDR) of the caller.

14. The network operator device of claim 13, wherein the processing unit determines that the scrutiny is required if analyzing the CDR reveals that
caller's calls have often been rejected by other callees, or
the caller's calls have lasted frequently less than a predetermined time interval.

15. The network operator device of claim 13, wherein the processing unit determines that the scrutiny is not required if analyzing the CDR reveals that prior calls between the caller and the callee lasted in average longer than a predetermined duration.

16. The network operator device of claim 10, wherein
the first message transmitted by the calling device is a Session Initiation Protocol (SIP) Invite message, and
the network operator device is configured to request the calling device's geographical location information by transmitting to the calling device a SIP response message, and
the network operator device is further configured to receive a SIP Update message transmitted by the calling device in reply to the SIP response message, the SIP Update message comprising a private header field comprising the geographical location information that identifies the stated geographical location of the calling device.

17. The network operator device of claim 10, wherein if the call is suspicious, the processing unit informs the callee before connecting the call, sending a rejection message to the caller, or not connecting the call to the callee.

18. The network operator device of claim 17, wherein the network operator device informs the callee that the caller is suspicious by at least one of:
forwarding the received geographical location information to the callee;
triggering an audio message prior to connecting the call; or
activating a warning signal detectable by the callee.

19. A method performed by a network operator for enhancing security of Voice Over Internet Protocol (VoIP) call from a calling device operated by a caller to a called device operated by a callee, the method comprising:
receiving a first message transmitted by the calling device, wherein the first message indicates that the calling device is initiating a VoIP call;
receiving a second message transmitted by the calling device, the second message comprising first geographic location information, the first geographic location information identifying a stated geographic location of the calling device;
identifying a network node that received the first message indicating that the calling device is initiating the VoIP call;

determining a geographical location of the network node; and comparing the stated geographic location of the calling device with the determined geographical location of the network node to determine whether the caller is suspicious; and as a result of determining that the caller is suspicious, transmitting a call rejection message to the calling device or informing the callee that the caller is suspicious, wherein obtaining the second geographic location information indicating the actual geographic location of the calling device comprises obtaining network node information identifying the actual geographic location of a network node that received the first message indicating that the calling device is initiating the call.

* * * * *